United States Patent
McGuire et al.

(10) Patent No.: US 6,293,449 B1
(45) Date of Patent: Sep. 25, 2001

(54) HANDLE-BAR CAMERA SUPPORT AND METHOD THEREFOR

(76) Inventors: Jeri L. McGuire; Kenneth Dean McGuire, both of 1713 Stonehaven Dr., Las Vegas, NV (US) 89108

( * ) Notice: Subject to any disclaimer, the term of this patent is extended or adjusted under 35 U.S.C. 154(b) by 0 days.

(21) Appl. No.: 09/412,940

(22) Filed: Oct. 5, 1999

(51) Int. Cl.[7] .................................................. B62J 7/06
(52) U.S. Cl. .................... 224/420; 224/443; 224/448; 224/451; 224/908; D12/114
(58) Field of Search ........................... 224/420, 425, 224/427, 441, 443, 445, 446, 448, 451, 908; D12/114

(56) References Cited

U.S. PATENT DOCUMENTS

| | | | |
|---|---|---|---|
| D. 370,193 | * | 5/1996 | Shull .................................. D16/244 |
| D. 382,286 | * | 8/1997 | Doran ................................. D16/242 |
| D. 394,669 | * | 5/1998 | Becker et al. ..................... D16/242 |
| D. 411,220 | * | 6/1999 | Surabian ............................ D16/242 |
| 1,069,160 | * | 8/1913 | Meltz ................................. 224/420 |
| 4,697,772 | * | 10/1987 | Kosugi et al. ..................... 248/183 |
| 4,981,243 | * | 1/1991 | Rogowski ......................... 224/420 |
| 5,467,906 | * | 11/1995 | Forman .............................. 224/420 |
| 5,575,443 | * | 11/1996 | Honeycutt ........................ 248/231.9 |
| 5,735,441 | * | 4/1998 | Fujimoto ........................... 224/420 |

* cited by examiner

*Primary Examiner*—Stephen K. Cronin
(74) *Attorney, Agent, or Firm*—Weiss & Moy, P.C.; Harry M. Weiss; Jeffrey D. Moy

(57) ABSTRACT

A handle-bar camera support and method therefor, comprising a vertical support member, a camera receiving member, and a handle-bar coupling member allowing attachment of the vertical support member to the handle-bar of a vehicle. A camera can be secured to the handle-bar of a vehicle, thus allowing for stable recording during the use of the vehicle.

3 Claims, 1 Drawing Sheet

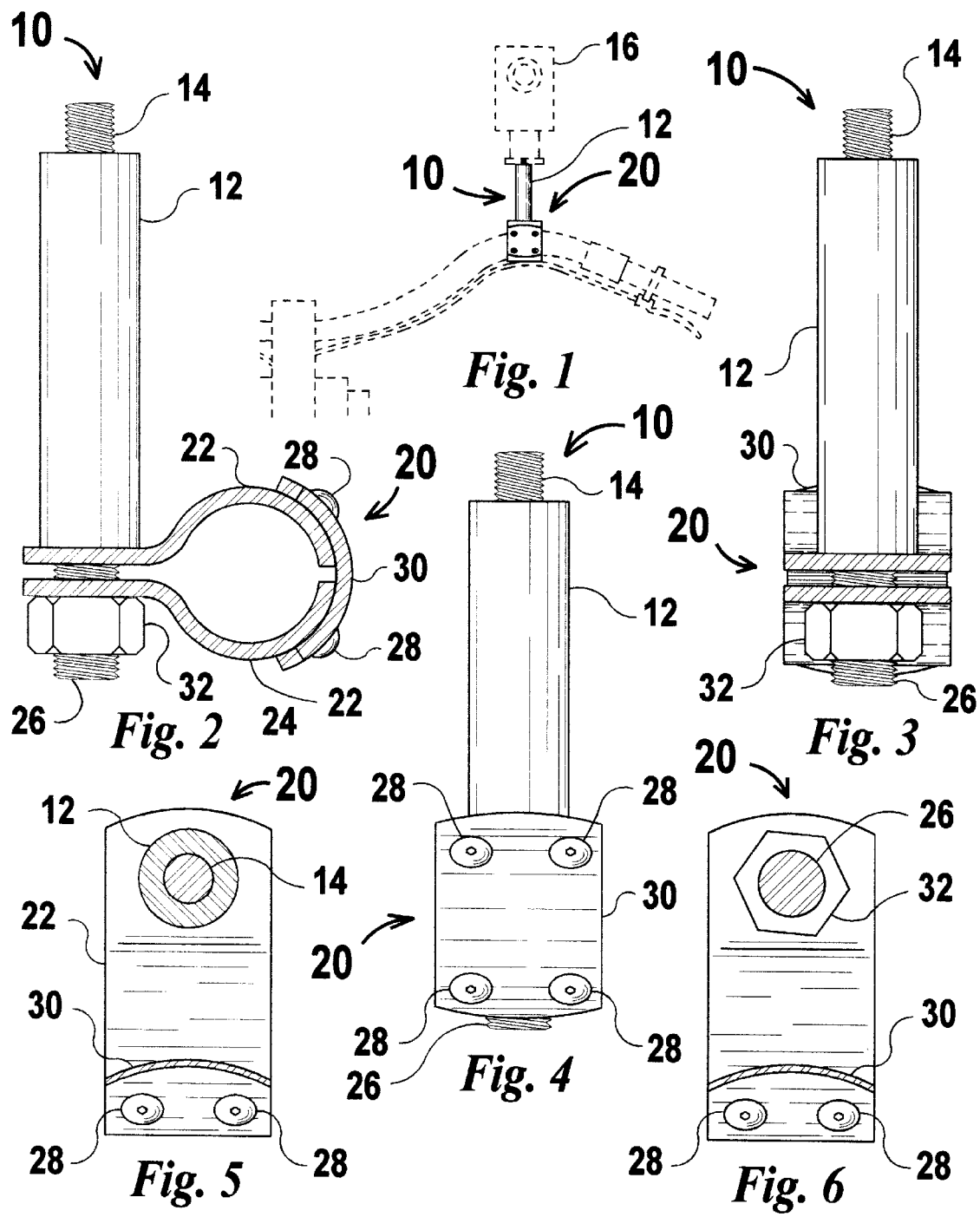

HANDLE-BAR CAMERA SUPPORT AND METHOD THEREFOR

FIELD OF THE INVENTION

This invention relates generally to camera support devices and methods therefor and, more specifically, to a device and a method for supporting a camera on a vehicle handle-bar.

BACKGROUND OF THE INVENTION

It is often desirable to be able to use video and still cameras while engaged in riding a vehicle. Those wanting to do so include law enforcement officers, journalists, or people who enjoy an active lifestyle. However, in order to obtain quality pictures, it is essential for the camera to be in a stable setting while it is in use. It is often difficult, if not impossible, for the individual operating the vehicle to try and also hold a camera in a steady position. Moreover, it can be dangerous for a person operating a vehicle to, at the same time, try to manually hold and operate a camera. In this regard, quick and agile-moving vehicles, often equipped with handle-bars for sudden turning, are particularly ill-suited for the use of a camera during operation of the vehicle.

Prior art camera supports, although providing stability, lack the appropriate design to allow for mounting a camera on the handle-bar of a vehicle. For example U.S. Pat. No. 3,589,260 issued to Ferra shows a camera mount attachable to a tripod. There are other camera supports, such as shown by U.S. Pat. No. 5,190,256 issued to Macchiarella and U.S. Pat. No. 5,833,101 issued to Watkins that are designed for fixably mounting a camera support inside a boat and car, respectively. U.S. Pat. No. 5,839,704 issued to Appleman is designed to be carried by an individual.

There are various problems with the devices of the prior art, however. They tend to be complex, have many parts, and are not designed specifically for the camera support to be attached to the handle-bar of a vehicle. Thus, a need existed for a relatively simple camera support that can maintain a camera's stability while providing for attachment to a vehicle's handle-bar.

SUMMARY OF THE INVENTION

An object of the present invention is to provide a handle-bar mounted camera support that enables the camera to take pictures from a stable position, and a method therefor.

BRIEF DESCRIPTION OF THE PREFERRED EMBODIMENTS

In accordance with one embodiment of the present invention, a camera support device comprising a vertical support member having a top end and a bottom end, means, connected to the top end of the vertical support member, for receiving a camera, and means, connected to the bottom end of the vertical support member, for coupling to a handle-bar of a vehicle.

In accordance with another embodiment of the present invention, a method for a camera support device comprising the steps of providing a vertical support means having a top end and a bottom end, providing means, connected to the top end of the vertical support member, for receiving a camera, a providing means, connected to the bottom end of the vertical support member, for coupling to a handle-bar of a vehicle.

The foregoing and other objects, features, and advantages of the invention will be apparent from the following more particular description of the preferred embodiments of the invention, as illustrated in the accompanying drawings.

BRIEF DESCRIPTION OF THE DRAWINGS

FIG. 1 is a perspective view of the preferred embodiment of the camera support device of the present invention shown installed on a vehicle handle-bar.

FIG. 2 is a side view of the camera support of FIG. 1.

FIG. 3 is a rear view of the camera support of FIG. 2.

FIG. 4 is a front view of the camera support of FIG. 2.

FIG. 5 is a top view of the camera support of FIG. 2.

FIG. 6 is a bottom view of the camera support of FIG. 2.

DETAILED DESCRIPTION OF THE PREFERRED EMBODIMENTS

Referring to the embodiment of FIG. 1, reference number 10 refers generally to the camera support device, hereinafter camera support device 10, of the present invention. Referring to FIGS. 1–5, the camera support device 10 generally comprises a vertical support 12 and extending upward therefrom a threaded screw 14 dimensioned to be rotatably inserted into a corresponding threaded opening (not shown) in a video or still camera 16 (shown in FIG. 1 only). While, in this embodiment, the structure allowing the mounting of the camera 16 to the vertical support 12 is the threaded screw 14, any structure allowing the ready and secure mounting of the camera 16 to the vertical support 12, including for example a securing bracket or strap configuration, will be within the spirit and scope of this invention.

Still referring to FIGS. 1–5, a handle-bar receiving bracket 20 is connected to the bottom end of the vertical support 12 for coupling to a handle-bar 18 (shown in phantom in FIG. 1) of a vehicle (not shown). The camera support device 10 may attach to the handle-bar 18 of any vehicle comprising handlebars in its design, such as a motorcycle, all-terrain vehicle, bicycle, personal watercraft and the like, and the term "vehicle" as used herein shall be interpreted to refer to any such mode of transportation.

Referring to FIGS. 1–6, the handle-bar receiving bracket 20 of the present invention is shown and described. Preferably, the handle-bar receiving the bracket 20 includes an upper, substantially C-shaped bracket 22 and a corresponding, lower, substantially C-shaped bracket 24, each extending from the vertical support 12 at substantially a ninety degree angle to form an opening dimensioned to receive therethrough the handlebar 18. A threaded screw 26 extends from the bottom of the vertical support 12 for securing it to the handle-bar receiving bracket 20 through corresponding openings (not shown) in the C-shaped brackets 22 and 24 with a nut 32.

A securing bracket 30 secures the upper substantially C-shaped bracket 22 and the lower substantially C-shaped bracket 24 at their distal ends. In the preferred embodiment, a total of four screws 28 are inserted into threaded apertures (not shown) in the upper substantially C-shaped bracket 22 and the lower substantially C-shaped bracket 24. While, in this embodiment, the handle-bar receiving bracket 20 comprises the upper substantially C-shaped bracket 22 and the lower substantially C-shaped bracket 24, secured to the camera support device 10 by the threaded screw 26 and nut 32, and secured to each other by securing bracket 30, any structure allowing the ready securing of the camera support device 10 to the handle-bar 18 of a vehicle, including for example bolting or welding the camera support device 10 directly to the handlebar 18, will be within the spirit and scope of this invention.

While the invention has been particularly shown and described with reference to preferred embodiments thereof, it will be understood by those skilled in the art that the foregoing and other changes in form and details may be made therein without departing from the spirit and scope of the invention.

We claim:

1. A device for supporting a camera comprising:

a vertical shaft having a top end and a bottom end;

a threaded screw projecting from said top end of said vertical shaft;

a clamping member adapted to be removably coupled about a tubular object; and means proximate said bottom end of said vertical shaft, for removably coupling said vertical shaft to said clamping member.

2. The device of claim 1, wherein said clamping member comprises:

an upper substantially C-shaped bracket, having a first end positioned proximate said vertical shaft and a second end distal thereto wherein said first and said second ends are disposed along a longitudinal axis;

a lower substantially C-shaped bracket, having a first end positioned proximate said vertical shaft and a second end distal thereto wherein said first and said second ends are disposed along a longitudinal axis;

wherein said upper and said lower substantially C-shaped brackets are disposed opposite each other to define an opening proximate said distal ends of said substantially C-shaped brackets located substantially perpendicular to said longitudinal axis of said substantially C-shaped brackets wherein said opening is dimensioned to receive therethrough said tubular object; and means for securing said upper and said lower substantially C-shaped brackets about said tubular object at substantially a ninety degree angle.

3. The device of claim 2, wherein said upper substantially C-shaped bracket and said lower substantially C-shaped bracket are secured to one another at said distal ends of said upper and said lower substantially C-shaped brackets by means of a securing bracket.

* * * * *